(12) United States Patent
Miller

(10) Patent No.: US 7,586,978 B2
(45) Date of Patent: *Sep. 8, 2009

(54) GMSK SPREAD MODULATION

(75) Inventor: Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/548,972

(22) Filed: Oct. 12, 2006

(65) Prior Publication Data

US 2007/0071069 A1 Mar. 29, 2007

Related U.S. Application Data

(63) Continuation of application No. 10/977,232, filed on Oct. 28, 2004, now Pat. No. 7,145,937.

(60) Provisional application No. 60/515,864, filed on Oct. 29, 2003.

(51) Int. Cl.
  *H04B 1/707* (2006.01)
  *H03K 7/02* (2006.01)
(52) U.S. Cl. .................. 375/146; 375/130; 375/353
(58) Field of Classification Search .......... 375/130, 375/135, 140, 141, 146, 300, 308, 353; 332/115; 370/320, 335, 342
  See application file for complete search history.

(56) References Cited

U.S. PATENT DOCUMENTS

| | | | |
|---|---|---|---|
| 5,020,075 A * | 5/1991 | Tachika | 375/146 |
| 5,276,705 A | 1/1994 | Higgins | |
| 5,668,795 A * | 9/1997 | Magill et al. | 370/209 |
| 6,208,615 B1 * | 3/2001 | Faruque et al. | 370/209 |
| 6,476,739 B1 * | 11/2002 | Lui et al. | 341/107 |
| 6,687,507 B2 | 2/2004 | Fischer et al. | |
| 6,760,393 B1 * | 7/2004 | Alisobhani et al. | 375/365 |
| 2002/0004400 A1 * | 1/2002 | Fischer et al. | 455/456 |

OTHER PUBLICATIONS

Abbey et al., "A Simple Coherent Receiver for Frequency-Hopped Pulse-Driven GMSK," IEEE, 1999, pp. 1-5.
Eldahab et al., "Adaptive Hybrid DS/SFH Spread-Spectrum Multiple Access Communications," Nineteenth National Radio Science Conference—Mar. 19-21, 2002, pp. 389-396.
El-Khamy et al., "GMSK/DS Spread-Spectrum Signaling with Two-Bit Differential Detection Over Mobile Channels with Frequency-Selective Fading," IEEE, 1997, pp. 270-274.
Kaleh, "Simple Coherent Receivers for Partial Response Continuous Phase Modulation," IEEE Journal of Selected Areas in Communications, vol. 7, No. 9, Dec. 1989, pp. 1427-1436.
Laurent, "Exact and Approximate Construction of Digital Phase Modulations by Superposition of Amplitude Modulated Pulses (AMP)," IEEE Transactions on Communications, vol. com-34, No. 2, Feb. 1996, pp. 150-160.
Peterson et al., "Introduction to Spread Spectrum Communications, Chapter 2," Prentice Hall, 1995, pp. 64-68.
Shiga et al., "Digital Matched Filter Detection of GMSK/DS/SS Signal," IEEE, 2000, pp. 1281-1284.
Yano et al., "Performance of DS/GMSK/PSK Modem Using Four-phase Correlator," IEEE, 1996, pp. 249-253.

* cited by examiner

*Primary Examiner*—Young T. Tse
(74) *Attorney, Agent, or Firm*—Townsend and Townsend and Crew LLP; Kenneth R. Allen

(57) ABSTRACT

Spread spectrum GMSK signals are presented. Transmission may involve obtaining a sequence of data symbols, obtaining a spread spectrum code comprising a sequence of spread spectrum chips, generating a sequence of pre-modulation chips by combining the sequence of data symbols with the spread spectrum chips, wherein for each data symbol, at least one of the pre-modulation chips is generated by taking into account at least the data symbol and at least one of the spread spectrum chips, performing Gaussian Minimum Shift Keying (GMSK) modulation using the sequence of pre-modulation chips to produce a spread spectrum GMSK signal, and transmitting the spread spectrum GMSK signal.

11 Claims, 5 Drawing Sheets

| BT Product | Bandwidth Definition | | | | | |
|---|---|---|---|---|---|---|
| | -6 dB | -10 dB | -20 dB | -30 dB | -40 dB | -60 dB |
| 0.1 | 0.7247 | 0.5929 | 0.4529 | 0.4235 | 0.3261 | 0.2508 |
| 0.2 | 1.0335 | 0.8397 | 0.6322 | 0.5269 | 0.4441 | 0.3317 |
| 0.4 | 1.0627 | 0.8184 | 0.6191 | 0.5394 | 0.3390 | 0.2967 |
| 0.5 | 1.0884 | 0.8344 | 0.6258 | 0.5563 | 0.3338 | 0.2512 |
| 0.6 | 1.1090 | 0.8438 | 0.6363 | 0.3961 | 0.3346 | 0.2389 |
| 0.8 | 1.1188 | 0.8569 | 0.6444 | 0.3836 | 0.3399 | 0.1873 |
| 1 | 1.0944 | 0.8550 | 0.6463 | 0.3800 | 0.2648 | 0.1865 |
| MSK | 1.1211 | 0.8694 | 0.6605 | 0.3770 | 0.2024 | 0.0568 |

GMSK SPREAD MODULATION

CROSS-REFERENCES TO RELATED APPLICATIONS

This application is a continuation of U.S. Application Ser. No. 10/977,232, filed Oct. 28, 2004, now U.S. Pat. No. 7,145,937, which claims priority from U.S. Provisional Application No. 60/515,864; filed Oct. 29, 2003. The 60/515,864 application is incorporated herein by reference.

BACKGROUND OF THE INVENTION

The present invention relates generally to the field of digital communications and more specifically to modulation and spread spectrum technologies. Spread spectrum techniques have proven to be extremely effective in building multiple access systems, combating or suppressing jamming and interference, transmitting signals at low power, and achieving message privacy from undesired listeners. Spread spectrum technology is characterized by a signal occupying an allocated bandwidth that is much wider than the data rate at which information is communicated. While many of the benefits and fundamental principals of spread spectrum techniques are well-known, actual design of spread spectrum systems can vary widely and face significant challenges in terms of performance, cost, and other considerations.

Spread spectrum systems commonly involve Phase Shift Keying (PSK) modulation as the modulation technique used in transmitting spread spectrum signals. PSK modulation refers to a general category of modulation schemes that may includes Binary Phase Shift Keying (BPSK), Quadrature Phase Shift Keying (QPSK), and others. PSK modulation schemes are often associated with "spill-over" of signal energy from the allocated bandwidth into adjacent bandwidths. This effect may be reduced by incorporating various envelope, waveform shaping, and/or other techniques. However, the need to improve spectral efficiency of modulated signals remains a fundamental problem in spread spectrum systems. This is especially true in limited bandwidth environments such as wireless and satellite systems, where neighboring signals packed closely together in the frequency spectrum may experience significant interference from one another due to unwanted "spill-over" of each signal outside of its allocated bandwidth.

Another important consideration in the design of spread spectrum systems is susceptibility to phase noise. In traditional multidimensional QPSK spread spectrum systems, the two dimensional data signals corresponding to in-phase (I) and quadrature (Q) components of the QPSK signal are each spread independently by separate spreading codes. Such independent spreading of the I and Q components means the combined complex signal does not necessarily represent each data symbol using antipodal signaling. This yields a modulation scheme characterized by degraded phase noise sensitivity as compared to antipodal modulation schemes.

U.S. Pat. No. 5,020,075 presents a "chip insertion" technique that utilizes a spread spectrum pseudo-random (PN) sequence in providing input to a minimum-shift-keying (MSK) modulator. In this patent, the PN sequence of chips is periodically interrupted with chips that represent symbols from a differentially encoded stream of data symbols. The resulting pre-modulation chip stream is presented to a minimum-shift-keying (MSK) modulator. To achieve Gaussian minimum-shift-keying (GMSK) modulation, the technique replaces the MSK modulator with a Gaussian filtered MSK modulator. However, this "chip insertion" technique is prone to significant performance degradations. For example, in "Performance of DS/GMSK/PSK Modem Using Four-Phase Correlator", Yano, et. al, IEEE Spread Spectrum Techniques and Applications Proceedings, 1996., pgs. 249-253, the performance of a QPSK chip insertion system is shown to be about 2 dB away from theoretical performance bounds.

Improvements to current design that address these and other shortcomings would undoubtedly advance spread spectrum technology toward its full potential as a powerful communications methodology.

BRIEF SUMMARY OF THE INVENTION

The invention presents methods, apparatuses, and systems for transmitting and receiving spread spectrum Gaussian Minimum Shift Keying (GMSK) signals. Transmission may involve obtaining a sequence of data symbols, obtaining a spread spectrum code comprising a sequence of spread spectrum chips, generating a sequence of pre-modulation chips by combining the sequence of data symbols with the spread spectrum chips, wherein for each data symbol, at least one of the pre-modulation chips is generated by taking into account at least the data symbol and at least one of the spread spectrum chips, performing Gaussian Minimum Shift Keying (GMSK) modulation using the sequence of pre-modulation chips to produce a spread spectrum GMSK signal, and transmitting the spread spectrum GMSK signal. The spread spectrum GMSK signal may adopt antipodal signaling to represent each data symbol. As an example, for each data symbol, if the data symbol takes on a first binary value, a corresponding portion of the spread spectrum GMSK signal exhibits a select waveform, and if the data symbol takes on a second binary value, the corresponding portion of the spread spectrum GMSK signal exhibits a phase-inverted version of the select waveform.

Each data symbol may correspond to K spread spectrum chips and K pre-modulation chips, wherein K is a positive integer. A leading one of the K pre-modulation chips corresponding to a current data symbol may be generated by taking into account (i) an immediately preceding data symbol, (ii) a final one of the K spread spectrum chips corresponding to the immediately preceding data symbol, (iii) the current data symbol, and (iv) a leading one of the K spread spectrum chips corresponding to the current data symbol, whereas remaining ones of the K pre-modulation chips corresponding to the current data symbol may each be generated by taking into account (i) an immediately preceding one of the K spread spectrum chips corresponding to the current data symbol, and (ii) a current one of the K spread spectrum chips corresponding to the current data symbol. According to one embodiment, the spread spectrum code utilized is a pseudo-noise (PN) code.

Reception may involve receiving a spread spectrum GMSK signal corresponding to a sequence of data symbols and a spread spectrum code, processing the received spread spectrum GMSK signal using at least one matched filter to produce at least one filtered signal, correlating the at least one filtered signal with the spread spectrum code corresponding to the spread spectrum GMSK signal to produce at least one correlation output, and evaluating the correlation output to estimate the sequence of data symbols.

DETAILED DESCRIPTION OF THE INVENTION

Introduction

Figure 1:
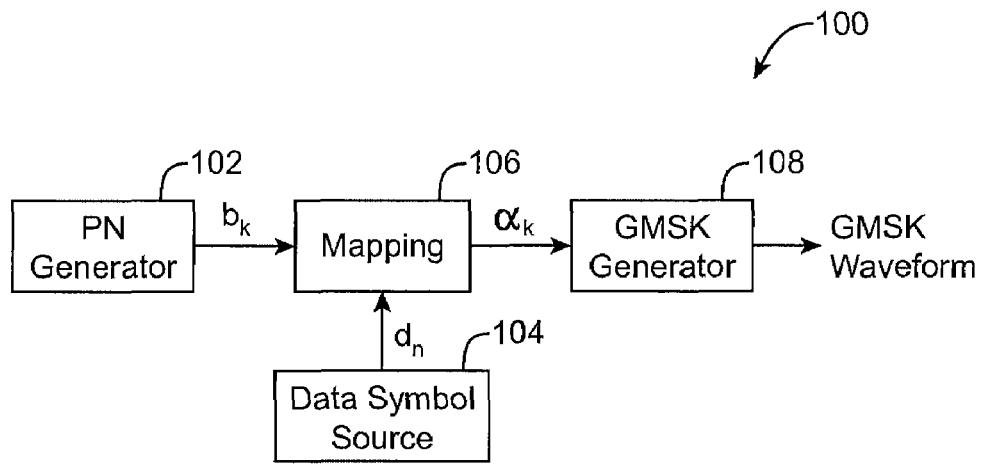
FIG. 1 is a basic block diagram of a system for transmitting a Gaussian Minimum Shift Keying (GMSK) modulation spread spectrum signal, in accordance with one embodiment of the present invention.

FIG. 1 is a basic block diagram of a system 100 for transmitting a spread spectrum Gaussian Minimum Shift Keying (GMSK) signal, in accordance with one embodiment of the present invention. As shown in the figure, a data symbol source block 104 provides a sequence of data symbols $d_n$, and a pseudo-random or pseudo-noise (PN) generator block 102 provides spread spectrum code $b_k$ to a mapping block 106. The spread spectrum code $b_k$ is also referred to as a sequence of spread spectrum chips. The mapping block 106 utilizes the data symbols $d_n$ and spread spectrum code $b_k$ to produce a sequence of pre-modulation "chips" $\alpha_k$, which is provided to a GMSK modulator block 108. The GMSK modulator block 108 performs GMSK modulation on the "chip" sequence $\alpha_k$ to produce a GMSK waveform for transmission.

According to the present embodiment, the mapping block 106 combines data symbols $d_n$ and spectrum code $b_k$ in such a way that the impression of the data symbols on the GMSK waveform produced by the GMSK modulation block 108 results in near antipodal signaling (BPSK). This provides a waveform characteristics of GMSK with data symbol performance and phase error sensitivity similar to that of BPSK. In addition, GMSK modulation allows spectral characteristics and Multiple Access Interference (MAI) performance to be easily traded off by adjustment of the GMSK parameter referred to as bandwidth-bit duration product (BT), or BT product, associated with the GMSK modulator block 108. This allows the GMSK waveform to be designed to meet the specific objectives of the system.

While a PN generator block 102 is shown in this figure, other codes suitable for spread spectrum applications may also be used in accordance with the present invention. Further, data symbols $d_n$ may broadly refer to any sequence of symbols representing data. For example, data symbols $d_n$ may represent information symbols that have not been error correction encoded. Alternatively, data symbols $d_n$ may represent error correction encoded symbols, such as Forward Error Correction (FEC) encoded symbols.

GMSK Description

According to the present embodiment, the input to the GMSK modulator block 108 is the "chip" sequence, $\alpha_k$. Here, the chips $\alpha_k$ take on binary values of +1 or −1. For modulator synthesis, GMSK may be described as a Continuous Phase Modulation (CPM) technique. The GMSK waveform may be defined as:

$$s(t) = A\cos\left(2\pi f + 2\pi h \sum_{k=0}^{m} \alpha_k q(t - kT_c)\right) \quad mT_c \le t \le (m+1)T_c \quad (1)$$

where f is the channel center frequency plus any requested frequency offset, $T_c$ is the chip duration (1/chip rate), h=0.5, and $$q(t) = \int_{-\infty}^{t} g(x)\,dx \quad (2)$$

$$g(t) = \frac{1}{2T_c}[Q(\sigma t_1) - Q(\sigma t_2)]$$

$$t_1 = \frac{t}{T_c} - \left(\frac{L+1}{2}\right)$$

$$t_2 = \frac{t}{T_c} - \left(\frac{L-1}{2}\right)$$

$$\sigma = \frac{2\pi BT_c}{\sqrt{\ln(2)}}$$

the function Q(t) is the standard Q function and is defined by:

$$Q(t) = \frac{1}{\sqrt{2\pi}} \int_{t}^{\infty} e^{-x^2/2}\,dx \quad (3)$$

Here, the product $BT_c$ is used to correspond to the chip duration $T_c$. The product $BT_c$ serves as a parameter that can be varied to trade off better spectral performance (lower $BT_c$) vs. better detection efficiency (higher $BT_c$). To simplify implementation, it can be roughly assumed for purposes of calculation that the frequency pulse, g(t) is only non-zero for a duration of about L chips ($0 \le t \le LT_c$). Similarly, the phase pulse q(t) is essentially 0 for t<0 and essentially equal to ½ for t>$LT_c$. As an example, with $BT_c$=0.25, the value of L is 4. For $BT_c$=0.20, the value of L should be increased to 5.

The description of q(t) in equation (2) is convenient for modulator realizations using a Frequency Modulation technique (such as a VCO or NCO). The integral in the description of q(t) above can be computed to get a direct expression for q(t):

$$q(t) = \frac{1}{2}\left[\begin{array}{l} 1 + t_1 Q(\sigma t_1) - t_2 Q(\sigma t_2) - \\ \frac{1}{\sigma\sqrt{2\pi}}(e^{-\frac{1}{2}\sigma^2 t_1^2} - e^{-\frac{1}{2}\sigma^2 t_2^2}) \end{array}\right] \quad (4)$$

This form is convenient for a realization using Phase Modulation synthesis techniques.

Laurent Expansion

To determine the mapping structure that gives the spread spectrum GMSK signal a BPSK nature to it, one may examine the Laurent PAM representation, described in "Exact and Approximate Construction of Digital Phase Modulations by Superposition of Amplitude Modulated Pulses". P. A. Laurent, IEEE Transactions Communications, vol. COM-34, 1986. Specifically, the baseband CPM signal consisting of K chips can be represented as the sum of 2L−1 PAM signals:

$$s(t) = e^{j\theta(t)} = \sum_{l=0}^{2L-1-1} \sum_{k=0}^{K-1} a_{l,k} h_l(t - kT_c) \quad (5)$$

For many values of the $BT_c$ product, the main pulse (corresponding to l=0) carries most of the signal energy. In this case, the only relevant pulse shapes and PAM data sequences are:

$$h_0(t) = \frac{1}{\sqrt{T_c}} \prod_{i=1}^{L} c(t - iT_c) \quad (6)$$

$$a_{0,k} = j^{(\sum_{i=0}^{k} \alpha_i)} = a_{0,k-1} j^{\alpha_k} \quad (7)$$

The basic function c(t) is defined by:

$$c(t) = \sin\left[\frac{\pi}{2}(1 - 2q(|t|))\right] \quad -LT_c \le t \le LT_c \quad (8)$$

Expressions for the other pulse functions and data symbols can be found in the appendix of "Simple Coherent receivers for Partial response Continuous Phase Modulation", G. K. Kaleh, IEEE Journal on Selected Areas in Communications, Vol 7, No 9, December 1989. From the recursion formula in equation (7), the PAM symbols are imaginary for n even and real for n odd.

Figure 2:
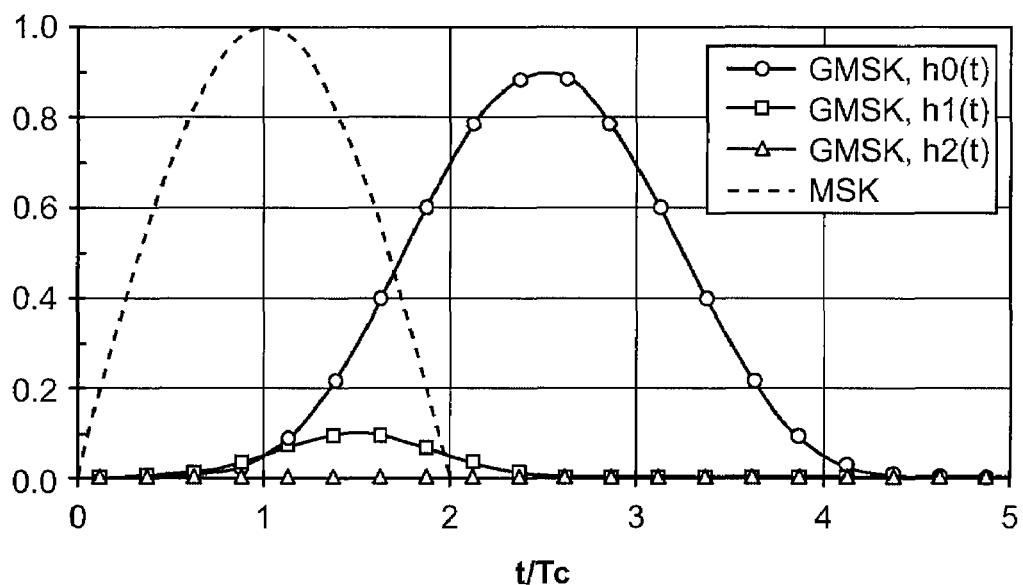
FIG. 2 illustrates the pulse functions for Minimum Shift Keying (MSK) and the PAM expansion functions $h_0(t)$, $h_1(t)$, and $h_2(t)$ for GMSK.

FIG. 2 illustrates the pulse functions, $h_1(t)$, for Minimum Shift Keying (MSK) and GMSK. For MSK, $$q(t) = \frac{1}{2}\frac{t}{T_c}$$

for $0 < t < T_c$, =0 for t<0, and =½ for $t > T_c$ and L=1. The function $h_0(t)$ has a duration of $2T_c$ and is shown in FIG. 2. The result is the standard offset QPSK view of MSK with sinusoidal pulse shaping and data mapping given by equation (7). Since the PAM data sequence $a_{0,k}$ alternates between real and imaginary values, little or no intersymbol interference is expected.

For GMSK with a $BT_c$ of 0.25, an acceptable value of L is 4. The duration of the main Laurent pulse is $5T_c$. The pulse shapes for the $h_o(t)$, $h_1(t)$, and $h_2(t)$ Laurent pulses shown in the figure above. Only the first two pulses are significant. Also, since the duration of the main pulse is larger than $2T_c$, this waveform will produce intersymbol interference.

Symbol Mapping

The objective for the mapping function is to combine the data symbols $d_n$ with the PN sequence $b_k$ to produce a pre-modulation chip sequence $\alpha_k$ such that the Laurent PAM expansion results in antipodal signaling for the main PAM pulse, $h_0(t)$. In particular, it is desired that all the values of $\alpha_{0,k}$ to be inverted during data symbol n, but only during data symbol n, if $d_n$ is inverted. An additional objective is to have a simple relationship between the data values for the main Laurent pulse ($\alpha_{0,k}$) and the spread spectrum chips ($b_k$). These objectives can be accomplished for the K chips within symbol interval n by using the following mapping:

$$\alpha_m = \alpha_{k+(n-1)K} = (-1)^m (\tilde{b}_{-1} \tilde{d}_{n-1}) \cdot (\tilde{b}_0 \tilde{d}_n) \quad k=0$$

$$\alpha_m = \alpha_{k+(n-1)K} = (-1)^m \tilde{b}_{k-1} \tilde{b}_k \quad k>0 \quad (9)$$

where $\tilde{b}_k = 2b_k - 1$ is the translation of the logic values of 0 and 1 to numerical values of −1 and 1 respectively. Likewise for $\tilde{d}_n = 2d_n - 1$. The term $\tilde{b}_{-1}$ is the last PN chip associated with data symbol $d_{n-1}$ (the previous symbol). For the first symbol in the packet ($d_0$), the previous symbol, $d_{-1}$, and the last PN chip of the previous symbol, $b_{-1}$, are both initialized to 1. The variable m is a chip counter that starts at 0 at the beginning of transmission and does not get reset at the end of any symbol. The variable k is the chip count within a symbol, ranging from 0 to K−1. In another embodiment of the present invention, the alternate inversion performed by the $(-1)^m$ term can be equivalently implemented in the receiver. In other words, the $(-1)^m$ term in Equation 9 may be omitted in generating the pre-modulation chips at the transmitter end. Instead the $(-1)^m$ term may be incorporated into the receiver structure.

Figure 3:
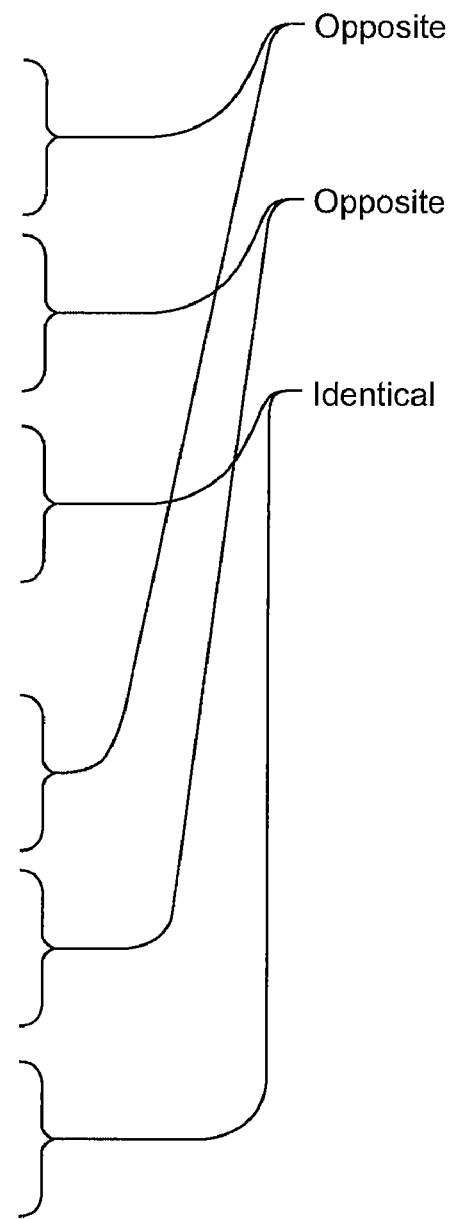
FIG. 3 is a table showing an example the mapping of data symbols $d_n$ and spread spectrum code $b_k$ into a pre-modulation chip sequence $\alpha_k$, in order to produce Laurent expansion PAM symbols $a_{0,k}$ that are antipodal with respect to each data symbol $d_n$.

FIG. 3 is a table showing an example of such mapping of data symbols $d_n$ and spread spectrum code $b_k$ into a pre-modulation chip sequence $\alpha_k$, in order to produce Laurent expansion PAM symbols $a_{0,k}$ that are antipodal with respect to each data symbol $d_n$. For purposes of illustration, K=4 chips per symbol is shown. The table illustrates the mapping of the sequence of data symbols 0-1-1 using a particular PN sequence, then illustrates the mapping of the sequence of data symbols 1-0-1 using the same PN sequence. As shown, the Laurent expansion PAM symbols exhibit antipodal signaling with respect to each data symbol. The first symbol of the two sequences are different, so their corresponding PAM expansions {−j, 1,−j, 1} and {+j,−1,+j, 1} are opposite. The second symbol of both sequences are also different, again yielding the two opposite PAM expansions {−j, 1, −j, 1} and {+j, −1, +j, −1}. Finally, the third symbol of both sequences are the same, yielding the identical PAM expansion {+j, 1, −j, −1}. The simple relationship between the PN chips and the I and Q values of the PAM symbols is also shown in the table. In particular, the 4 PN chips for the first data symbol are {1,0, 1,1} and the four I and Q values for the PAM symbols are {−1, 1, −1, −1}. In all cases, the I and Q values for the PAM symbols are just the exclusive OR of the PN chip and the data symbol with the result shifted up to values of +1 or −1 by multiplying by 2 and subtracting 1.

In the present embodiment of the invention, the pre-modulation chip sequence $\alpha_k$ is generated such that the Laurent PAM expansion results in antipodal signaling for the main PAM pulse, $h_0(t)$. Since the main PAM pulse represents most, but not all, of the energy in the baseband CPM signal, the resulting spread spectrum GMSK signal is antipodal in a general sense. That is, the resulting spread spectrum GMSK signal may be antipodal to an extent that satisfies performance requirements, but it may not be perfectly antipodal. Thus, for each data symbol, if the data symbol takes on a first binary value, a corresponding portion of the spread spectrum GMSK signal exhibits a select waveform, and if the data symbol takes on a second binary value, the corresponding portion of the spread spectrum GMSK signal exhibits a phase-inverted version of the select waveform. The phase-inverted version of the select waveform may be a nearly exact, but not perfectly exact, phase-inverted replica of the select waveform.

Demodulator Structure

Figure 4:
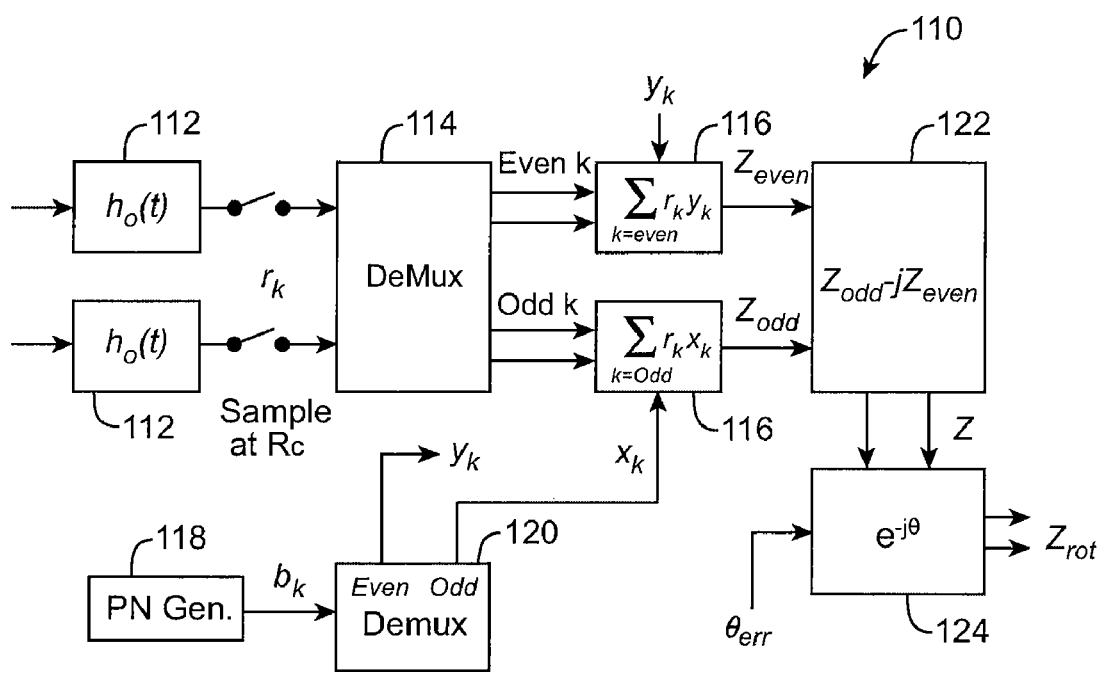
FIG. 4 is a basic block diagram of a demodulator structure for receiving a GMSK modulation spread spectrum signal, in accordance with one embodiment of the present invention.

FIG. 4 is a basic block diagram of a demodulator structure 110 for receiving a spread spectrum GMSK signal, in accordance with one embodiment of the present invention. For antipodal signaling, an optimum symbol-by-symbol demodulator correlates the received signal with the expected signal under the hypothesis, $d_n=1$, and compares the real part of the output to zero (after phase rotation to remove the phase error). The correlator output is for the $n^{th}$ symbol is, $$Z_n = \int r(t)[x_n(t)+jy_n(t)]^* dt \tag{10}$$

The signal r(t) is the received complex valued (I and Q components) baseband signal, x(t) is the real part of the expected signal with $d_n=1$ and y(t) is the imaginary part of the expected signal. The integration is performed over to time duration, which is occupied by one symbol of K chips. The simple demodulator structure 110 can be derived by assuming all the PAM pulses to be negligible except the main pulse $h_0(t)$. By using this assumption, the expected signal over the $n^{th}$ symbol interval can be well approximated by $$x_n(t) + jy_n(t) = \sum_{k=0}^{K-1} a_{0,k} h_0(t-kT_c) \tag{11}$$

$$= \sum_{\substack{k'=0 \\ k'=odd}}^{K-1} x_{nK+k'} h_0(t-(nK+k')T_c) +$$

$$j \sum_{\substack{k'=0 \\ k'=even}}^{K-1} y_{nK+k'} h_0(t-(nK+k')T_c)$$

$$x_k = \text{Re}\{a_{0,k}\}$$
$$y_k = \text{Im}\{a_{0,k}\}$$

thus the correlation in equation (10) becomes, $$Z_n = \sum_{k'=odd} x_k r_k - j \sum_{k'=even} y_k r_k \tag{12}$$
$$k = nK + k'$$

where $r_k$ is the output (sampled once per chip) of a filter matched to the main Laurent pulse, $$r_k = \int r(t) h_0(t-kT_c) \tag{13}$$

Referring to FIG. 4, received signal(s) are provided to one or more filters 112 matched to the main Laurent pulse $h_0(t)$. The sampled filtered output $r_k$ is provided to a de-multiplexer block 114, which outputs separated even and odd samples of $r_k$. The even and odd samples of $r_k$ are provided to correlator blocks 116. A PN sequence block 118 generates the same spread spectrum code $b_k$ originally used by the transmitter to generate the spread spectrum GMSK signal. The spread spectrum code $b_k$ is provided to a de-multiplexer 120, which outputs separated even samples $y_k$ and odd samples $x_k$. The even and odd samples $y_k$ and $x_k$ are also provided to the correlator blocks 116.

In this manner, correlator blocks 116 correlate the received signal with the expected signal under the hypothesis $d_n=1$. This results in correlation outputs $Z_{even}$ and $Z_{odd}$, which are combined at a combiner block 122 to produce a complex result Z. The complex result Z is provided to a phase rotation block 124, which performs a phase rotation operation to compensate for any phase error. This results in an output $Z_{rot}$. The phase-rotated output $Z_{rot}$ may then be used to estimate the data symbols carried in the spread spectrum GMSK signal.

When timing and phase is not known, such as during the preamble (burst acquisition), the sample rate out of the chip matched filter, $h_o(t)$, may be increased to allow several different timing hypothesis to be attempted. A sample rate of $2R_c$ may enable 4 timing hypothesis per main Laurent pulse (one I or Q channel pulse per two chips). In addition, a non-coherent metric, such as $|Z|^2$, may be used to accommodate the unknown, random phase.

Performance

For large channel bit error rates (BERs), the channel BER of the spread spectrum GMSK waveform can be accurately approximated (details omitted) by, $$P_b = Q\left(\sqrt{\frac{2\frac{E_s}{N_o} H_0(0)}{1 + 4\frac{E_s}{N_o}\frac{\alpha}{K^2 H_0(0)} + 2\frac{E_s}{N_0}\frac{\beta}{K \cdot H_0(0)}}}\right) \tag{14}$$

Comparing equation (14) to the standard BER expression for coherent BPSK, one can see that degradation occurs due to the term $H_0(0)$ in the numerator and the second two terms in the denominator. The term $H_0(0)$ is the energy in the first Laurent Pulse, $h_o(t)$. This value is slightly less than unity. The second term in the denominator is due to the interference with the $h_o(t)$ pulses from the chips in the two adjacent symbols. The third term is the interference with the higher order Laurent pulses from the chips in the current symbol as well as the adjacent symbols. The terms $\alpha$ and $\beta$ are constants which are functions of the cross correlation of the Laurent pulses.

By examining equation (14), the interference terms in the denominator get smaller as K gets larger and get larger as the interferer signal to noise ration (Es/No) gets larger. Thus it is expected that the degradation to be larger at higher Es/No and to be independent of Es/No as K gets large. For large values of K the performance approaches that of theoretical coherent BPSK.

Figure 5:
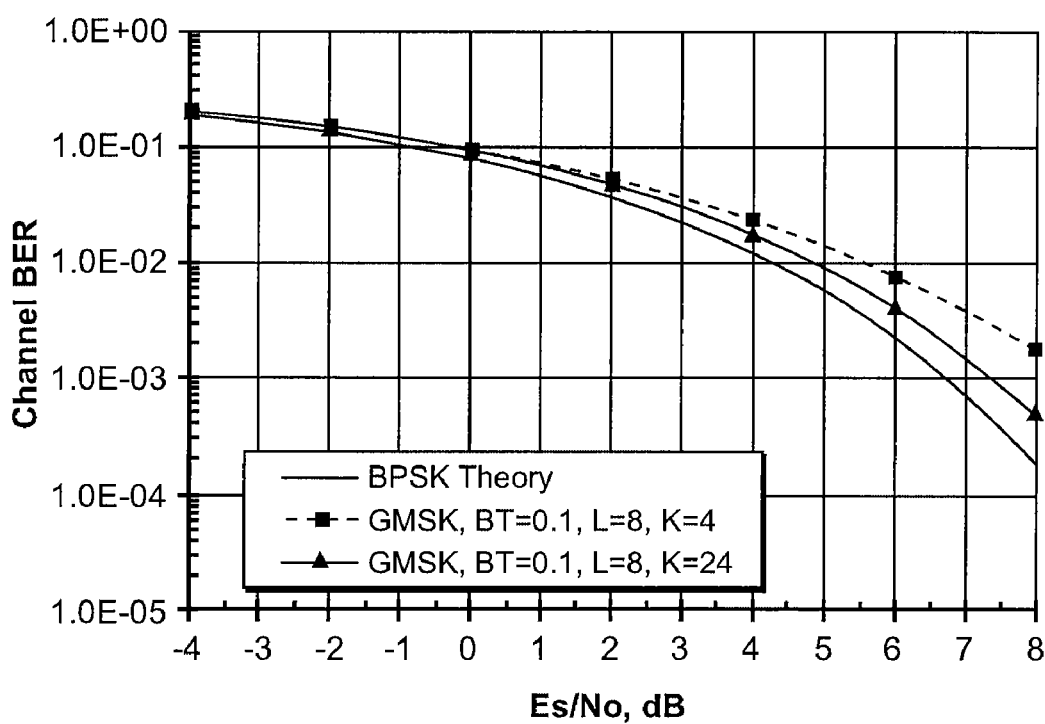
FIG. 5 is a plot of computer simulation results for channel BER performance versus Es/No.
Figure 6:
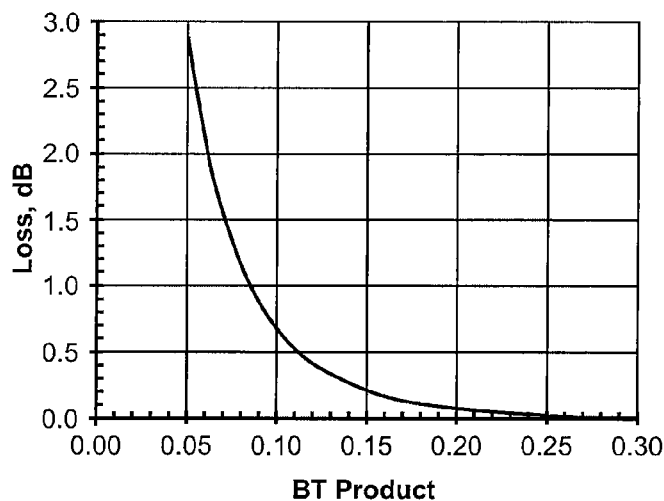
FIG. 6 is a plot of the calculated loss versus different values of the GMSK BT product.

FIG. 5 is a plot of computer simulation results for channel BER performance versus Es/No. The simulations were performed for a BT product of 0.10. These results confirm the analytical observations regarding equation (14). As expected, the degradation becomes fixed for all values of Es/No as the number of chips per symbol (K) increases to 24. At this point, the second two terms in the denominator are negligible. In fact, at the Es/No range of interest (−4 dB≦Es/No≦0 dB), the inter-chip interference terms are negligible even for the minimum value of K (4 chips per symbol). Therefore, the degradation with respect to theoretical coherent BPSK in the interesting range of Es/No can be accurately approximated as just the energy in the first Laurent pulse, $h_o(t)$. This approximation is expected to hold for all values of K. FIG. 6 is a plot of the calculated loss, with respect to theoretical coherent BPSK, versus different values of the GMSK BT product.

Spread Spectrum GMSK Spectral Characteristics

Figure 7:
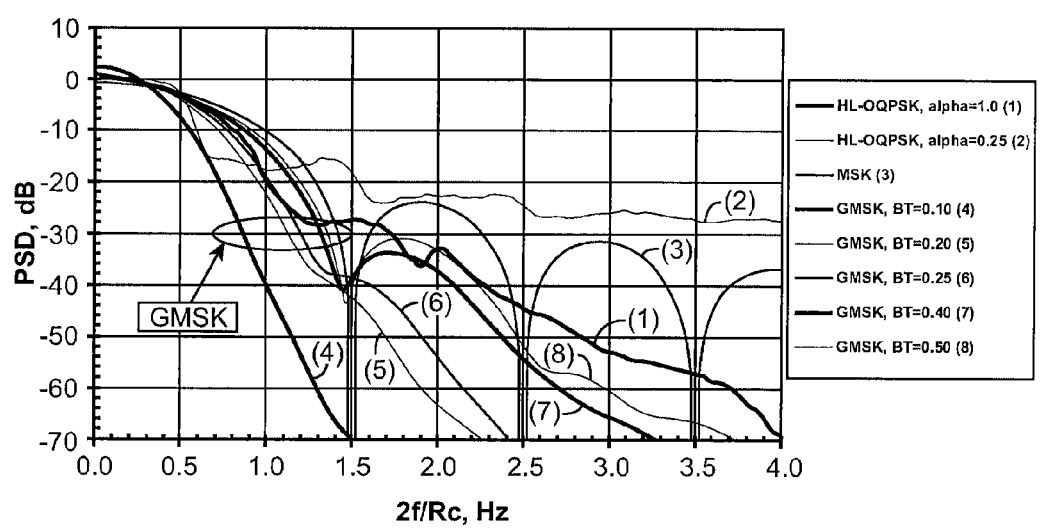
FIG. 7 illustrates the calculated power spectral density (PSK) of various modulated signals, including QPSK, offset QPSK, MSK, and GMSK signals of different BT products.

Another dimension to the selection of the BT product is the spectral occupancy. FIG. 7 illustrates the calculated power spectral density (PSK) of various modulated signals, including QPSK, offset QPSK, MSK, and GMSK signals of different BT products. These results are calculated using analytical techniques. Ideally, the spectrum of the transmitted signal would have a rectangular "boxcar" shape. This would allow one to place all of the signal energy in the allocated bandwidth and none outside of the allocated bandwidth. No known constant envelope signal has this characteristic. As demonstrated in the figure, the GMSK signal family possesses roll-off which is much faster than that other constant envelop waveforms considered.

Spectral characteristics can be further improved by using several FDMA channels, each of smaller chip rate and consisting of, for example many Code Division Multiple Access (CDMA) waveforms, to support the network traffic instead one single channel of a larger chip rate. An example will illustrate this best. Suppose one has purchased 30 MHz of bandwidth and it is required that the PSD outside of the purchased bandwidth be 30 dB down. First consider the use of a single spread spectrum GMSK signal using a BT product of 0.25. When a BT product of 0.25 is used, the 30 dB bandwidth (double sided) of the signal is about 1.3 times the chip rate. The maximum chip rate that could be supported is 23.08 MHz.

Now consider the use of N FDMA channels in the 30 MHz purchased bandwidth. The signals in each channel uses spread spectrum GMSK modulation with a BT product of 0.25. The spacing between channels is set to be 0.75 times the chip rate. At this spacing the PSD's of adjacent channels cross at the −10 dB point. This is conservative and in all likelihood, a smaller spacing between channels could be used. The composite spectrum of N channels will have a 30 dB bandwidth of, $$W = (N-1)\Delta R_c + BW_{30} R_c \qquad (15)$$

where W is in Hz, $\Delta R_c$ is the channel spacing, and $BW_{30}$ is the 30 dB bandwidth of a single GMSK signal normalized by the chip rate. Suppose there are N=10 channels. The spacing $\Delta$ is 0.75, and $BW_{30}$=1.3. Thus the 30 dB bandwidth of sum of all signals is 8.05 time the chip rate. The maximum chip rate for each signal will be 3.73 MHz (=30 MHz/8.05). Since there are 10 FDMA channels, the effective chip rate for this system is 37.27 MHz, a factor of 1.6 greater than the example with 1 FDMA channel.

As seen in the example above, one can gain more physical layer capacity by using several FDMA channels each of smaller chip rate. The gain is due to the resulting composite spectrum looking more like the ideal "boxcar" spectrum. The more FDMA channels used, the more ideal the spectrum will look. However, there is a diminishing return on increasing N, so the question is how many big should N be. Using a normalized channel spacing (normalized by the chip rate) of $\Delta$ and a normalized 30 dB bandwidth of $BW_{30}$, the maximum chip rate that can be supported by a single FDMA channel approach is $W/BW_{30}$ where W is the allocated bandwidth. Using N FDMA carriers, the maximum chip rate that can be supported by each carrier is $R_c = W/[(N-1)\Delta + BW_{30}]$. The effective chip rate, due to all N channels, will be the N times as large. The ratio of the multi channel effective chip rate to the single channel chip rate determines the capacity gain (as previously shown, the capacity of a CDMA system is proportional to the chip rate)

$$\text{Gain} = \left[\left(\frac{N-1}{N}\right)\frac{\Delta}{BW_{30}} + \frac{1}{N}\right]^{-1} \qquad (16)$$

As N becomes large, the gain goes to $BW_{30}/\Delta$. This represents the maximum possible gain. Selection of N=5 will yield more than 85% of the maximum achievable gain. Selection of N=10 will more than 90% of the maximum achievable gain.

Multiple Access Interference (MAI)

The final dimension in the selection of BT product is the performance of the spread spectrum GMSK signal in the presence of MAI. GMSK with different values of BT will have different BER performance to the same levels of MAI. Intuitively, one would expect that use of GMSK with higher value BT would provide more resistance to MAI than lower of BT values since the occupied bandwidth is larger for the same chip rate. This is indeed the case, and the relationship has been quantified using the approach described below.

For N, asynchronous MAI interfering sources (all of the same power level), the classical equation for relating N to Eb/No is $$\frac{E_b}{I_o} = \frac{W/R_b}{N} = \frac{\beta R_c/R_b}{N} \qquad (17)$$

The only ambiguity is the definition of the bandwidth W. The bandwidth may be defined as $W = \beta R_c$. The constant $\beta$ is a function of the BT product. A larger value of $\beta$ results in more MAI resistance since the resulting Eb/Io is larger. The value of $\beta$ is defined such that the variance of the MAI out of the GMSK matched filters is identical to the variance of the thermal noise out of the GMSK matched filters when the Eb/No is set to a level of $\beta R_c/(R_b N)$. This allows the total Eb/(No+Io) to be computed as the parallel combination of $E_b/N_o$ and $E_b/I_o$.

Figures 8, 9:
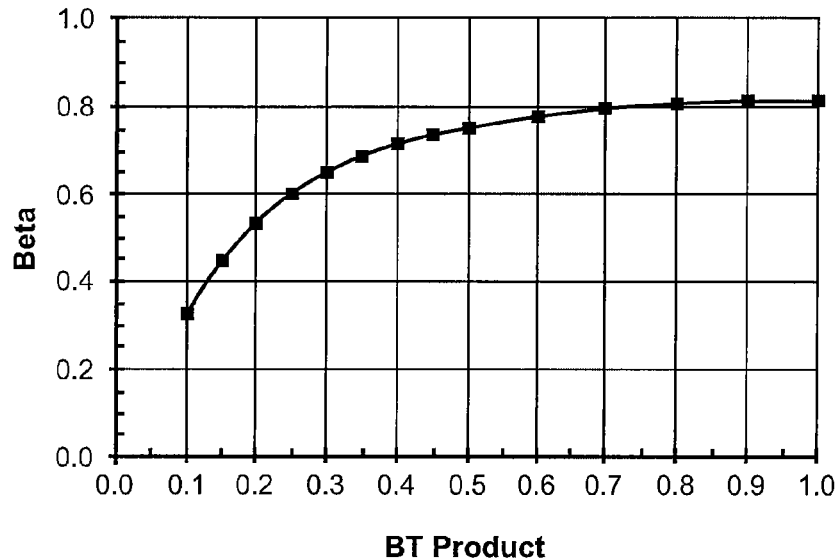
FIG. 8 is a plot showing the constant $\beta$ tabulated for different values of the BT product.
FIG. 9 is a table showing values of a figure of merit (FOM) for various bandwidth definitions and BT products.

As an example, suppose that the variance of the MAI out of the GMSK matched filter is measured to be $\sigma^2$ when $R_c/R_b$ is 100 and N is 50. The variance out of the GMSK matched filters is also measured to be $\sigma^2$ when the Eb/No is set to 2.5 dB. Thus the performance with the above MAI and no thermal noise scenario is identical (in terms of the second order statistics out of the matched filter) to that of the thermal noise only at an $E_b/N_o$ of 2.5 dB. to aim is to select a constant $\beta$ such that the resulting $E_b/I_o$ is 2.5 dB. This results in value of $\beta$=0.8891. FIG. 8 is a plot showing the constant $\beta$ tabulated for different values of the BT product.

Optimal Selection of BT Product

FIG. 9 is a showing values of a figure of merit (FOM) for various bandwidth definitions and BT products. Here, the occupied bandwidth of a single GMSK signal is $W = \alpha R_c$, where the definition of occupied bandwidth corresponds to some PSD bandwidth, such as 10 dB bandwidth or 30 dB bandwidth. As previously shown, the CDMA capacity is proportional to $\beta/\alpha$. Thus, a good FOM for optimizing the BT selection is $\beta/\alpha$, which is illustrated in the table. A larger FOM indicates a better waveform choice. For comparison purposes, regular MSK is also shown. The bandwidth definition is the ratio of the PSD at the edge of band to the PSD at band center.

When it is required for the PSD of the signal to be very low out of band, like 40 or 60 dB lower than center of band, a small value of the BT product of about 0.2 will optimize the capacity. When a larger out of band PSD can be tolerated, a higher value of BT, or even MSK, should be used. For a 30 dB out of band PSD, the optimum value of BT is about 0.5. For certain multi-channel applications, carriers will be spaced as close together as possible. The bandwidth of interest for these carriers is more like a −10 dB, or greater bandwidth. Thus one would think that plain MSK might be the best modulation choice. However, it may be desired that the PSD of the two edge channels roll off faster since they will determine the bandwidth occupancy of the composite return channel (all FDMA channels). Regulatory or other constraints may dictate, for example, that the relevant bandwidth definition for the two edge channels be around 30 dB, which indicates an optimum selection of BT=0.5. By looking at the table, it is clear that there is very little degradation in the FOM by using a BT product of 0.5 when the PSD roll off of interest is in the −6 to −20 dB range. In practice, one might want to use a BT product slightly smaller than 0.5 to compensate for some small amount spectral expansion in the modulator implementation. Thus, in one embodiment of the present invention, the optimum selection of BT product will generally lie in the 0.4 to 0.5 range.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for transmitting a modulated signal comprising:
   obtaining a sequence of data symbols;
   obtaining a spread spectrum code comprising a sequence of spread spectrum chips;
   generating a sequence of pre-modulation chips by combining the sequence of data symbols with the sequence of spread spectrum chips, wherein for each data symbol of said sequence of data symbols, at least one of the pre-modulation chips is generated by taking into account at least the data symbol and at least one of the spread spectrum chips;
   performing Gaussian Minimum Shift Keying (GMSK) modulation using the sequence of pre-modulation chips to produce a spread spectrum GMSK signal; and
   transmitting the spread spectrum GMSK signal as said modulated signal,
   wherein the spread spectrum GMSK signal is capable of being approximated as a pulse amplitude modulation (PAM) signal.

2. The method of claim 1 wherein the spread spectrum GMSK signal adopts antipodal signaling to represent each data symbol.

3. The method of claim 1 wherein each data symbol corresponds to K spread spectrum chips and K pre-modulation chips, wherein K is a positive integer.

4. The method of claim 1 wherein even ones and odd ones of the sequence of pre-modulation chips separately correspond to in-phase (I) and quadrature (Q) components of the PAM signal.

5. The method of claim 1 wherein the spread spectrum code is a pseudo-noise (PN) code.

6. The method of claim 1 wherein the GMSK modulation adopts a bandwidth-bit duration (BT) product within a range from 0.4 to 0.5.

7. An apparatus for transmitting a modulated signal comprising:
   a data processing unit capable of receiving a sequence of data symbols and combining the sequence of data symbols with a spread spectrum code comprising a sequence of spread spectrum chips to produce a sequence of pre-modulation chips, wherein for each data symbol of said sequence of data symbols, at least one of the pre-modulation chips is generated by taking into account at least the data symbol and at least one of the spread spectrum chips; and
   a modulator coupled to the data processing unit and configured to perform Gaussian Minimum Shift Keying (GMSK) modulation on the sequence of pre-modulation chips to produce a spread spectrum GMSK signal as said modulated signal to be transmitted, wherein the spread spectrum GMSK signal is capable of being approximated as a pulse amplitude modulation (PAM) signal.

8. The apparatus of claim 7 wherein even ones and odd ones of the sequence of pre-modulation chips separately correspond to in-phase (I) and quadrature (Q) components of the PAM signal.

9. The apparatus of claim 7 wherein the spread spectrum code is a pseudo-noise (PN) code.

10. The apparatus of claim 7 wherein the GMSK modulation adopts a bandwidth-bit duration (BT) product within a range from 0.4 to 0.5.

11. A system for transmitting a modulated signal comprising:
    means for obtaining a sequence of data symbols;
    means for obtaining a spread spectrum code comprising a sequence of spread spectrum chips;
    means for generating a sequence of pre-modulation chips by combining the sequence of data symbols with the sequence of spread spectrum chips, wherein for each data symbol of said sequence of data symbols, at least one of the pre-modulation chips is generated by taking into account at least the data symbol and at least one of the spread spectrum chips;
    means for performing Gaussian Minimum Shift Keying (GMSK) modulation using the sequence of pre-modulation chips to produce a spread spectrum GMSK signal; and
    means for transmitting the spread spectrum GMSK signal as said modulated signal,
    wherein the spread spectrum GMSK signal is capable of being approximated as a pulse amplitude modulation (PAM) signal.

* * * * *